United States Patent [19]

Davis et al.

[11] 4,335,766
[45] Jun. 22, 1982

[54] APPARATUS AND METHOD FOR DELIMBING FELLED TREES

[76] Inventors: Lawny Davis, Box 287A, Preble Ave.; Derwood Preble, Hill Top Rd., both of Anson, Me. 04911

[21] Appl. No.: 198,507

[22] Filed: Oct. 20, 1980

[51] Int. Cl.³ .................................. B27L 1/06
[52] U.S. Cl. .................................. 144/343; 144/2 Z
[58] Field of Search .......... 144/2 Z, 3 D, 309 AC, 144/208 R

[56] References Cited

U.S. PATENT DOCUMENTS

| | | | |
|---|---|---|---|
| 3,556,181 | 1/1971 | Jouppi | 144/2 Z |
| 3,805,858 | 4/1974 | Morin | 144/2 Z |
| 3,948,299 | 4/1976 | Laforge et al. | 144/2 Z |
| 3,951,188 | 4/1976 | Dawson | 144/2 Z |
| 4,067,367 | 1/1978 | Adamson | 144/2 Z |
| 4,172,478 | 10/1979 | Dakus | 144/2 Z |
| 4,205,712 | 6/1960 | Boschen | 144/309 AC |

*Primary Examiner*—W. D. Bray
*Attorney, Agent, or Firm*—Pollock, Vande Sande & Priddy

[57] ABSTRACT

An apparatus (22) for delimbing felled trees (12, 14) comprises a rigid frame (28) defining a central aperture (42, 44, 46) which is crossed by a gridwork of resiliently mounted cables (76, 92, 102, 104, 122). Trees are pushed top first through the gridwork, which expands and contracts its apertures to accommodate the changing diameter of the tree, while snapping off its limbs.

22 Claims, 9 Drawing Figures

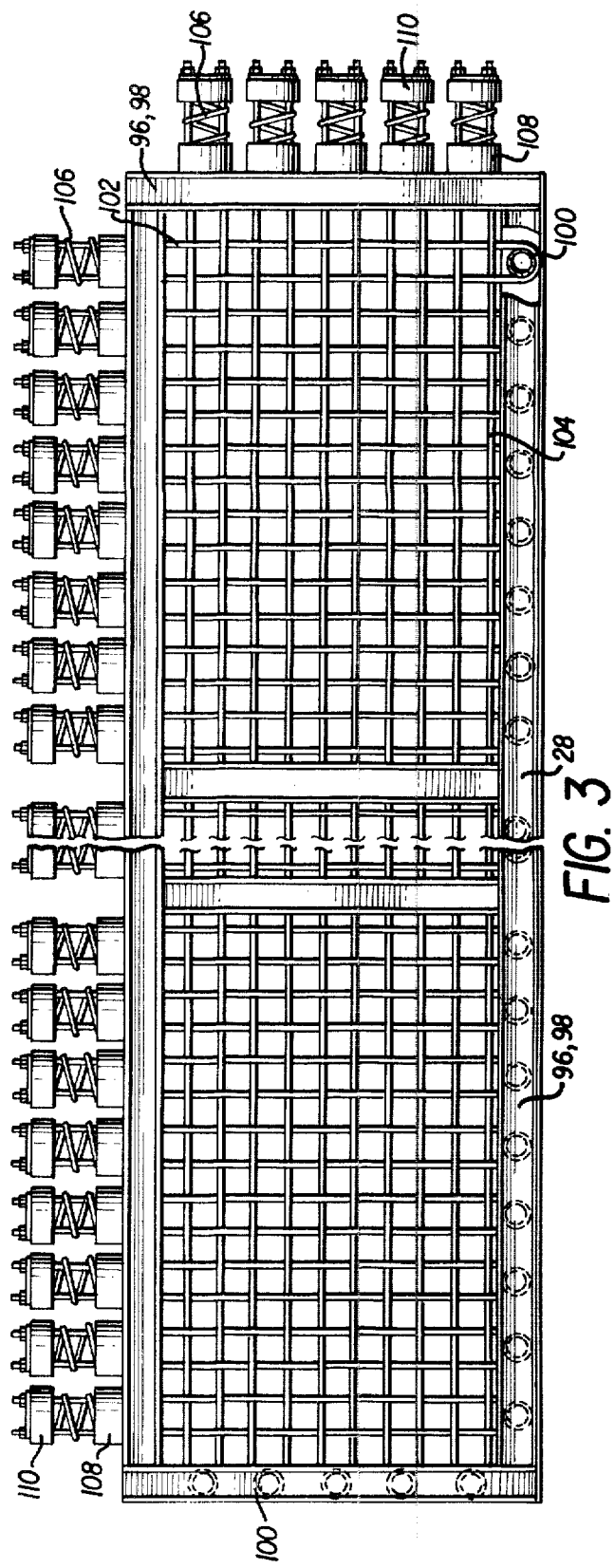
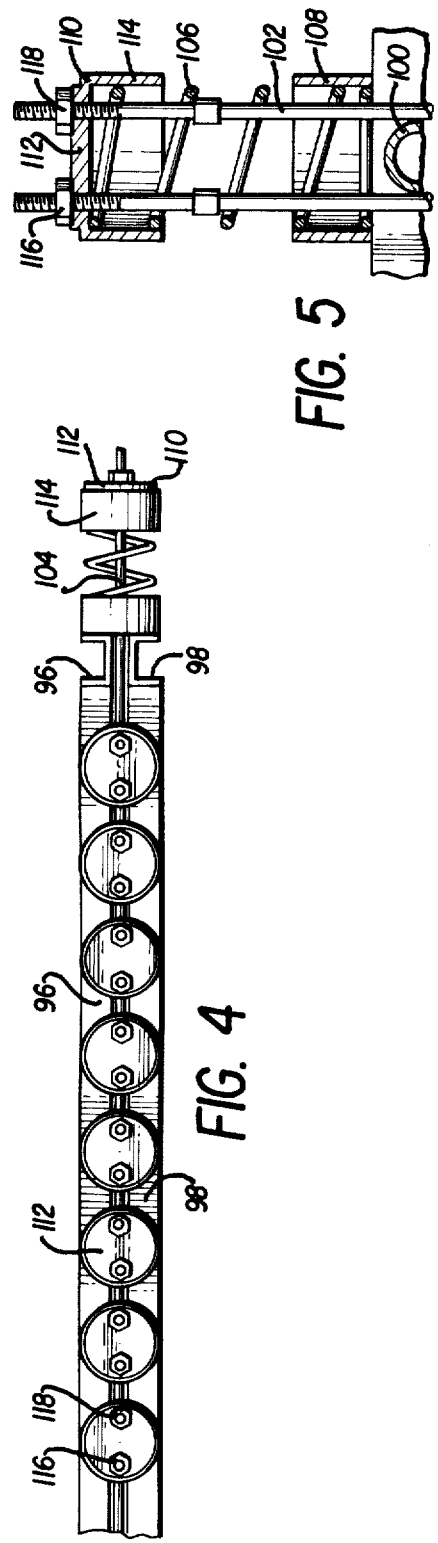

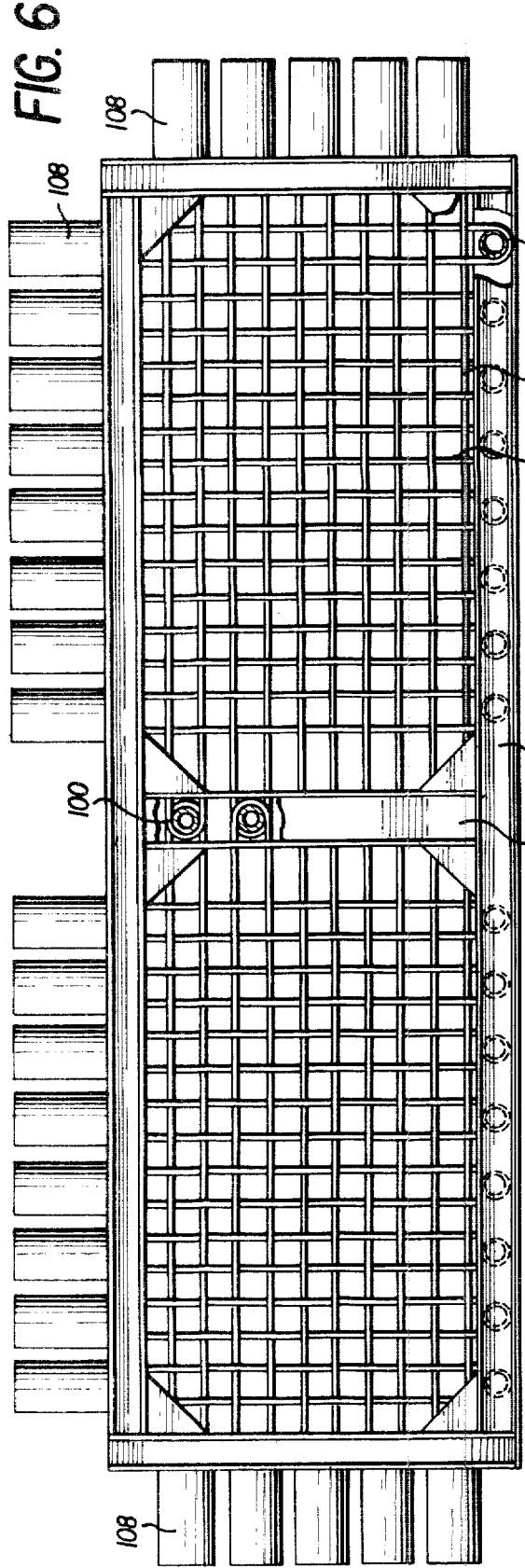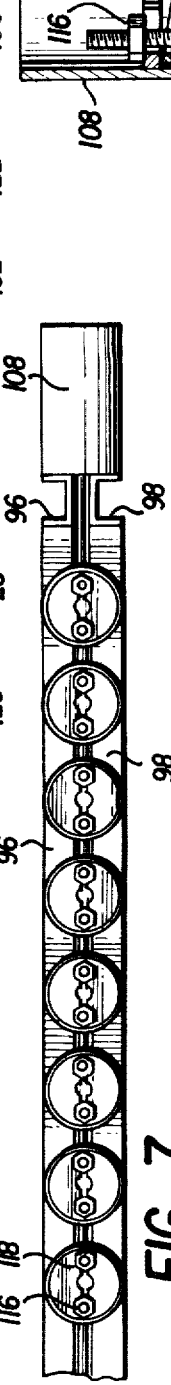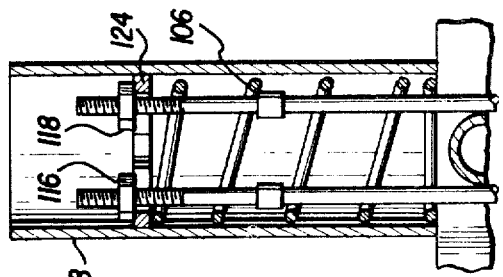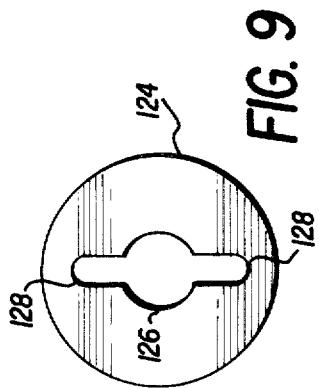

APPARATUS AND METHOD FOR DELIMBING FELLED TREES

Description

1. Technical Field

The invention concerns apparatuses and methods for removing limbs from trees. More particularly, it relates to delimbing apparatuses for use with felled trees, of the type in which a tree is pushed through a gridwork which snaps off the tree's limbs, leaving an essentially bare trunk.

2. Background Art

In the tree harvesting and logging technologies, removal of the limbs of a felled tree has long been a vexing, time-consuming chore. In some small operations, limbs are removed using hand tools such as axes and chain saws. In larger, more efficient logging enterprises, power driven chain flails, rotating blade rollers, vehicle-mounted tree gripping and limb-shearing machines and similar complex equipment have been in use for some time. One notably simpler delimbing device comprises a stationary, rigid gridwork through which the felled tree is drawn to break off its limbs.

Complex delimbing equipment of the former kind has the normal disadvantages of complicated mechanical devices, such as high initial cost, susceptibility to inoperability due to failure of a minor part, difficulty of maintenance, and the like. The rigid gridwork delimber avoids many of these difficulties; however, the fixed apertures of its gridwork necessarily are too small for some trees, which must be delimbed by other techniques; or too large for smaller trees, which may not be fully delimbed. A need has continued to exist for a simple, reliable delimber which is capable of effectively delimbing trees of a variety of diameters.

DISCLOSURE OF THE INVENTION

The primary objective of the present invention is to provide an improved apparatus and method for delimbing felled trees.

Another object of the invention is to provide such an apparatus and method which effectively removes limbs from trees having a substantial range of minimum and maximum trunk diameters.

Another object of the invention is to provide such an apparatus which is simple, rugged and easily set up for use in a logging area.

Still another object of the invention is to provide such an apparatus in which a grid or framework of flexible elements such as cables is provided, the grid having apertures through which felled trees are pushed to snap off their limbs, the apertures being expandible and contractible to accommodate changes in trunk diameter and the tension applied to the cables being adjustable to account for variations in the brittleness of the limbs to be removed.

These objectives of the invention are given only by way of example; thus, other desirable objectives and advantages inherently achieved by the apparatus and method according to the invention may occur or become apparent to those skilled in the art. Nonetheless, the scope of the invention is to be limited only by the appended claims.

One embodiment of the apparatus according to the invention includes an essentially rectangular, rigid frame having at least one central opening. The sides of the frame are provided with spaced passages extending through their widths. At least two of the sides of the frame include outwardly extending guide rails within which tensioning beams are supported by coil springs which extend between each beam and the frame. Cables are threaded back and forth across the openings of the frame through the previously mentioned passages and through aligned passages in the tensioning beams. The compression of the coil springs is adjusted so that a relatively constant tension is applied to the cable portions extending between the sides of the frame. Although the use of cables is preferred for forming such a flexible gridwork within the rigid frame, it is within the scope of the present invention to use lengths of chain, combinations of chain and cable, combination rigid rod segments and springs or similar flexible elements to define the grid, so long as those portions of the elements extending through the central opening of the frame are sufficiently flexible to accommodate changes in tree trunk diameters.

In use, this embodiment of the invention is erected on the ground either by means of an integral support frame which maintains the rigid frame upright on the ground or by means of chains or cables which simply secure the frame upright to a pair of suitably spaced trees or posts. Felled trees are then pushed, top first, through the gridwork of flexible elements so that as the tree passes through the gridwork, its limbs are snapped off as they contact and are bent by the flexible elements. As the tree moves through the gridwork, the flexible elements are free to move to accommodate the increasing trunk diameter and tension is maintained on the cables by the coil springs acting on the tensioning beams at the sides of the frame.

In the embodiment of the invention just described, the tensioning beams preferably are located on the outside of the rigid frame so that the coil spring members are compressed during operation of the apparatus. However, it is also within the scope of the present invention to mount the tensioning beams on the inside of the frame so that the springs extending between the tensioning beams and the frame are subjected to tensile forces in operation.

In another embodiment of the apparatus according to the invention, a plurality of outwardly extending coil springs are provided which bear against the outside of the rigid frame. The outer ends of each spring are covered by a cylindrical cap to which the ends of a shorter flexible element are attached, thus eliminating the need for a tensioning beam. Each flexible element preferably extends from its associated cap, through its coil spring, through a passage in the side member of the frame, across the central aperture of the frame, around an anchoring member located on the opposite side of the frame and back through the spring to the cap. Precise adjustment of the tension on each flexible element is achievable by adjusting the compression of its associated coil spring. The frame itself is built from lengths of channel beams set back-to-back and spaced from each other by short lengths of pipe which also act as anchors for the flexible elements. Though flexible elements are preferred which make only two traverses of the central opening of the frame, it is also within the scope of the invention to provide flexible elements which make only a single traverse from an attachment to the frame on one side to a tensioning spring on the other side of the frame. Of course, flexible elements which make several traverses are also within the scope of the invention.

In the preferred embodiment of the apparatus according to the invention, the horizontal extent of the central opening in the frame is chosen so that the tension in each flexible element may be maintained, thus minimizing any tendency of the flexible element to sag to an undesirable extent near its center. In this embodiment, each flexible element also is provided with an individual tensioning spring and each tensioning spring is enclosed with a protective cylindrical wall to prevent its becoming entangled with debris during operation. The previously mentioned cylindrical caps or covers are replaced in this embodiment by a simple force-transmitting plate which bears against the outer end of the spring. The plate is provided with a specially configured central opening which facilitates insertion and removal of the ends of the flexible elements.

As already indicated, the method according to the invention requires that a rigid frame be provided having a central opening across which extends a plurality of resiliently supported flexible elements such as cable segments which define a gridwork having a plurality of tree receiving apertures which are expandible and contractible to accommodate differing tree trunk diameters. Felled trees are then pushed through this gridwork to remove their limbs.

BRIEF DESCRIPTION OF THE DRAWINGS

FIG. 3 shows a plan view of another embodiment of a tree delimbing apparatus according to the invention.

FIG. 4 shows a fragmentary top view of the apparatus of FIG. 3.

FIG. 5 shows an elevation view, partially in section, of the cable tensioning structure of the embodiment shown in FIGS. 3 and 4.

FIG. 6 shows a plan view, partially in section, of the preferred embodiment of the apparatus according to the invention.

FIG. 7 shows a fragmentary top view of the apparatus illustrated in FIG. 6.

FIG. 8 shows an elevation view, partially in section, of the cable tensioning structure of the embodiment illustrated in FIGS. 6 and 7.

FIG. 9 shows a plan view of the force transmitting plate used in the structure illustrated in FIG. 8.

BEST MODE FOR CARRYING OUT THE INVENTION

Figure 1:
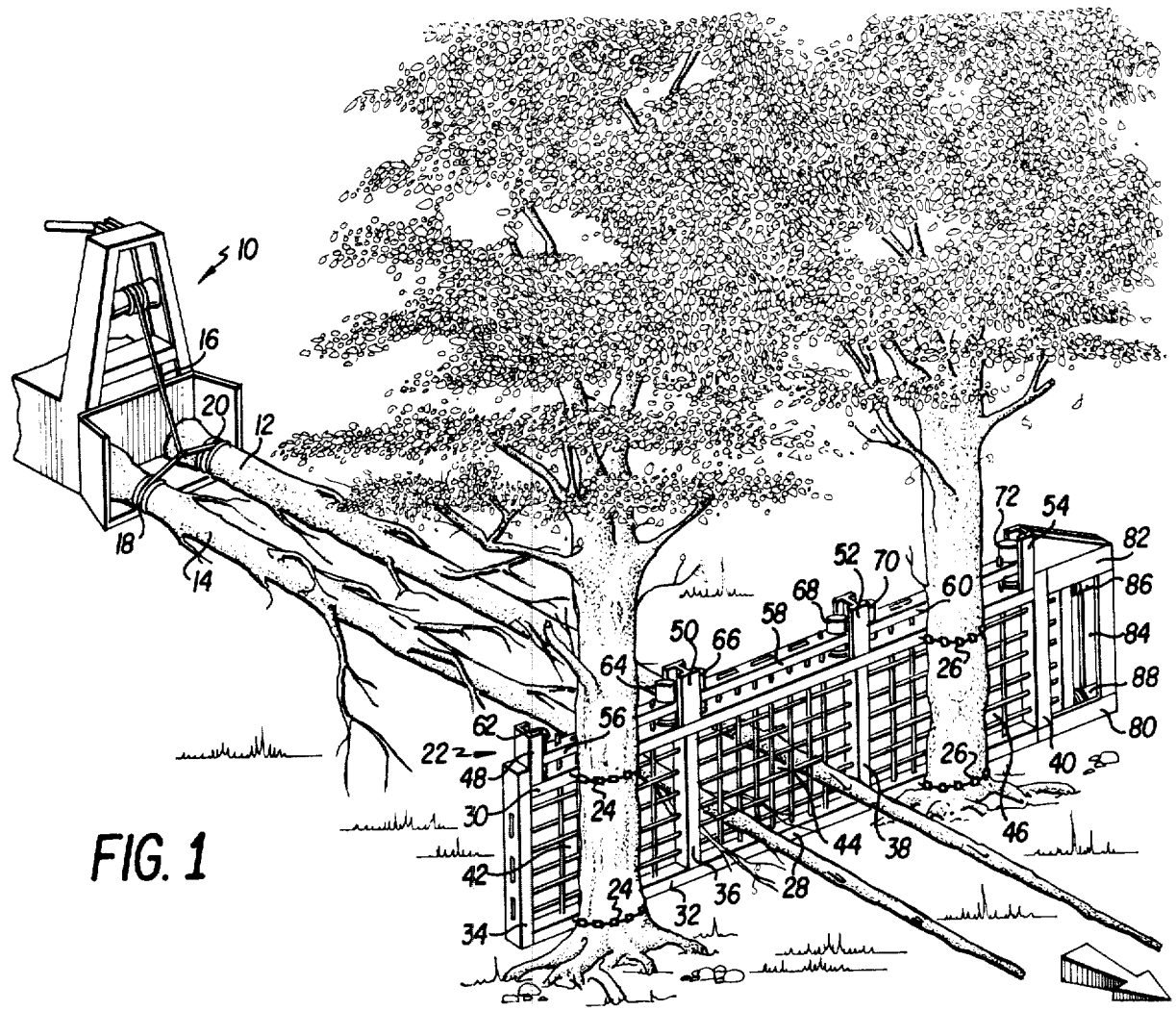
FIG. 1 shows a perspective view of a tree delimbing apparatus according to the invention as mounted for operation in a logging area.

The following is a detailed description of various embodiments of the invention, reference being made to the drawings in which like reference numerals identify like elements of structure in each of the several Figures.

Figure 2:
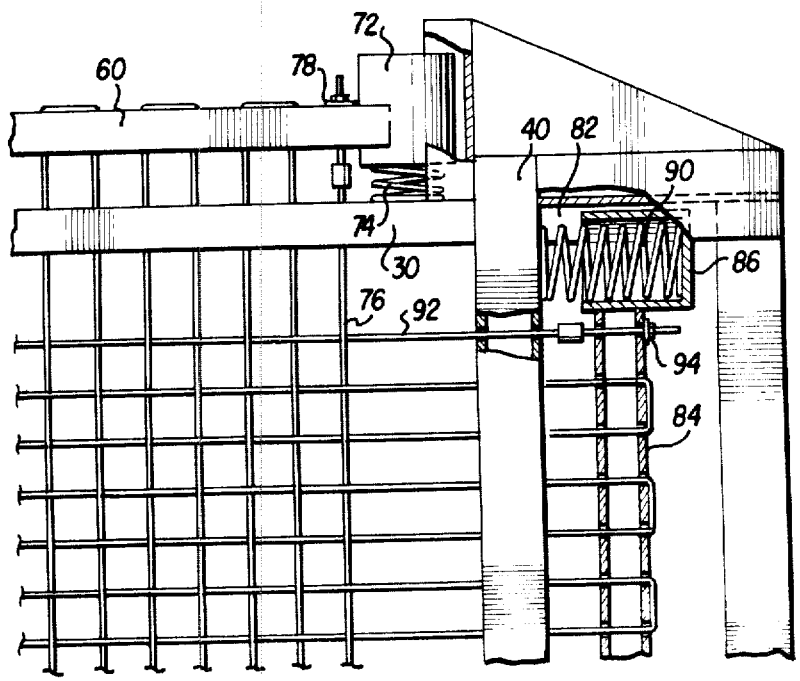
FIG. 2 shows a fragmentary plan view of the upper right portion of the delimbing apparatus illustrated in FIG. 1.

FIGS. 1 and 2 illustrate the structure of one embodiment of the invention and also show in general how each embodiment is used to remove limbs from felled trees. As indicated in FIG. 1, a conventional skidder 10 such as a tractor is used to move felled trees 12, 14 by means of a winch cable 16 and a pair of chokers 18, 20. Of course, more than two trees can be delimbed simultaneously. The trees are moved toward and through a tree declimbing apparatus 22 according to the invention which is shown secured to a suitable pair of trees by means such as chains 24, 26. As the trees pass through the apparatus 22, their limbs are snapped off at or close to the trunk and the flexible elements of the delimber move as necessary to accommodate the increasing diameter of the trunk.

Apparatus 22 comprises a horizontally elongated rigid frame 28 which may be assembled by welding together lengths of box beams, channel beams, I-beams and the like. An upper horizontal box beam 30 and a lower horizontal box beam 32 are joined by vertical box beams 34, 36, 38 and 40 into an essentially rectangular frame having three central openings 42, 44 and 46. Across the top of upper beam 30 are located four upwardly extending guide rails 48, 50, 52 and 54 which may be made from short sections of channel beams facing inwardly at the ends of the frame; and from short sections of I-beams at the intermediate locations on the frame. Between each pair of guide rails is located one of tensioning box beams 56, 58 and 60. At each end of each tensioning beam is attached one of spring retainer cylinders or caps 62, 64, 66, 68, 70 and 72. Each retainer cylinder surrounds a resilient coil spring 74 which extends from the cylinder into contact with upper beam 30, as shown most clearly in FIG. 2. Upper and lower box beams 30, 32 and tensioning beams 56, 58, 60 are provided with spaced passages along their lengths which are aligned vertically so as to permit a flexible element such as a cable 76 to be threaded back and forth between each tensioning beam and lower box beam 32. The ends of cable 76 are secured to the tensioning beam by means such as a nut 78 threaded onto a rod attached to each end of the cable. As shown in FIG. 1, a separate cable 76 would be required for each of central openings 42, 44, 46.

In a similar fashion, a pair of laterally extending guide rails 80, 82 made from channel and I-beams are attached to box beam 40 at the right end of frame 28, as illustrated. A tensioning box beam 84 is positioned to move between rails 80, 82 and has attached to its ends a pair of spring retainer cylinders or caps 86, 88. A coil spring 90 is positioned within each spring retainer cylinder in order to apply tension to a cable 92 which is threaded back and forth between box beam 34 and tensioning beam 84 through aligned passages provided in beams 34, 36, 38, 40 and 84. Means such as a nut 94 are used to secure the ends of cable 84 to tensioning beam 84.

At the time of assembly of the apparatus shown in FIGS. 1 and 2, the tensioning beams are placed between their associated guide rails with their coil springs in place between the spring retainer cylinders and the adjacent box beam. Cables 79 and 92 are then threaded back and forth between the tensioning beams and the opposite box beam of the frame. As illustrated in FIG. 2, the cables are woven together in the openings of the frame. Cable tension is then adjusted by clamping the tensioning beams to compress their associated coil springs; drawing the cables tight; and tightening nuts 78 and 94. In order to achieve a relatively uniform tension on all of the cable segments extending across the central openings of the frame, it may be necessary to repeat this operation while working or flexing the cables as necessary to evenly distribute the load.

While actual use of the embodiment shown in FIGS. 1 and 2 has demonstrated that trees can be quickly and efficiently delimbed using an apparatus embodying the present invention, certain difficulties have been encountered with the embodiment of FIGS. 1 and 2. For example, obtaining and maintaining proper tension in the cables requires frequent adjustment under certain operating conditions. Broken cables are relatively difficult to replace since a rather long run of cable must be unthreaded from the surrounding frame to permit its replacement. These difficulties are relieved to a considerable extent by the embodiment of the invention shown in FIGS. 3 to 5. Here, frame 28 is assembled from a number of back-to-back channel beams 96, 98, rather than the box beams used in the embodiments of FIGS. 1 and 2. Channel beams 96, 98 are spaced from each other and joined by a plurality of short pipe segments 100 which are welded between the beams to function both as spacers and as anchor points for the cable. The relatively long cables 79 and 92 used in the previously discussed embodiment are replaced by a plurality of vertically extending cables 102 and a plurality of horizontally extending cables 104. Each of cables 102 and 104 passes between beams 96, 98, across the central opening defined by the frame, around one of anchors or spacers 100 and back across the central opening, thus making only two traverses of the central opening. A plurality of coil springs 106 is provided, preferably one coil spring for each cable. A short cylindrical wall or collar 108 is welded to the frame around the end of spring 106 which abuts channel beams 96, 98. A cap 110 comprising a circular top plate 112 having spaced bores for receiving the ends of each cable 102 and a depending cylindrical wall 114 is positioned over the outer end of each coil spring 106. The ends of each cable are secured to cap 110 by means such as nuts 116, 118. Thus, in this embodiment, the tension in each cable can be rather easily adjusted by tightening nuts 116 and 118 or by clamping the springs and then tightening the nuts. Should one of the cables break during use, the apparatus is not completely disabled since adjacent cables will retain their tension. Replacement of a broken cable is relatively simple due to the reduced length of the cables used.

FIGS. 6 to 9 illustrate the preferred embodiment according to the present invention. In consideration of matters such as the total weight of the apparatus and the occasionally limited space for maneuvering such a device in a forest where logging is in progress, the overall length of the device is typically in the range of 15 to 20 feet and the overall height in the range of 4 to 10 feet. It has been found that in the embodiment of FIGS. 3 to 5, the horizontally extending cables 104 were of such a length that the inherent elasticity of such a long cable made it difficult to achieve and maintain the desired cable tension with the amount of adjustment which could conveniently be provided using means such as nuts 116, 118. Thus, the cables tended to relax somewhat following initial use with the result that the overall effectiveness of the apparatus was reduced. In the embodiment of FIGS. 6 to 9, this disadvantage has been essentially eliminated by reducing the maximum horizontal extent of any single cable to the range of 6 to 9 feet, where three-quarter inch wire cable is used. This result has been achieved by providing a single central vertical beam 120 made up, once again, from a pair of back-to-back channel beams 96, 98 separated by a plurality of spacers or anchors 100. Shorter cables 122 are then wrapped around anchors 100 of beam 120 and attached to tensioning springs at both ends of frame 28. To prevent debris from interfering with the movement of the cables and springs, walls 108 have been extended past the upper end of springs 106 and cap 110 has been replaced by a force-transmitting plate 124 having an enlarged central bore 126 and a pair of radially extending slots 128 sized to permit the ends of the cables to pass through.

In one actual version of the preferred embodiment of FIGS. 6 to 9, frame 28 was approximately 16 feet, 5 inches long and collars 108 were 18 inches long, for an overall length of 19 feet 5 inches. The frame was approximately 3 feet, 9 inches high, for an overall height of 5 feet, 2 inches. Channel beams 96, 98 were 4 inches deep, and approximately 14 inches wide steel beams. Spacers 100 were 2.5 inch Schedule 80 pipe at the bottom and center of the frame, and 2.0 inch Schedule 40 pipe at the top and ends. Cables 102, 122 were three-quarter inch wire ropes and springs 106 were five-eighths inch coil springs approximately 5.5 inches in diameter and 15 inches long. Walls 108 were made from 6 inch diameter Schedule 40 steel pipe. The cables were set at 7 inch spacing. Trees having diameters varying from three to thirty inches have been delimbed using such an apparatus.

Industrial Applicability

The disclosed apparatus and method are especially useful for delimbing softwood trees; however, they may also be used for delimbing certain types of hardwood trees by appropriately adjusting the cable spacing and tension in accordance with the teachings of the invention.

Having described our invention in sufficient detail to enable those skilled in the art to make and use it, we claim:

1. Apparatus for removing limbs from felled trees, comprising:
   an essentially upright frame having a central opening;
   a plurality of flexible elements extending across said central opening and defining a grid of said elements within said central opening, said grid having a plurality of tree-receiving apertures;
   means operatively engaged with said frame for resiliently supporting said plurality of flexible elements and permitting said elements to move so that tree-receiving apertures expand and contract to accommodate the changing diameter of a tree trunk; and
   means operatively engaged with said frame for anchoring said apparatus relative to the ground.

2. Apparatus according to claim 1, wherein said elements comprise sections of flexible cable extending across said central opening to define said grid.

3. Apparatus according to claim 1, wherein said elements are comprised of at least one first length of flexible cable extending back and forth across said central opening in an essentially horizontal direction and at least one second length of flexible cable extending back and forth across said central opening in an essentially vertical direction, to define said grid.

4. Apparatus according to claim 1, wherein said frame comprises rigid members surrounding said central opening; and said means for resiliently supporting said plurality of elements comprises at least one tensioning beam and spring means extending between said at least one tensioning beam and at least one of said rigid members, said elongated elements being attached to said at least one tensioning beam, at least at one end of said elements.

5. Apparatus according to claim 4, wherein said frame comprises guide channels within which the ends of said at least one tensioning beam can move.

6. Apparatus according to claim 4, wherein said frame is essentially rectangular in configuration, with one of said rigid members defining each side of the rectangle; and there are two of said tensioning beams, one extending essentially horizontally and the other extending essentially vertically adjacent to said frame; further comprising a first pair of spaced guide channels extending from said frame for guiding the ends of the one of said tensioning beams and a second pair of spaced guide channels extending from said frame for guiding the ends of the other of said tensioning beams.

7. Apparatus according to claim 6, wherein said tensioning beams are located outside said frame and said pairs of guide channels extend outwardly from said frame.

8. Apparatus according to claim 6, wherein said spring means are coil springs maintained in compression to impart tension to said elements.

9. Apparatus according to claim 6, wherein said elements comprise sections of flexible cable extending across said central opening to define said grid.

10. Apparatus according to claim 6, wherein said elongated elements are comprised of at least one first length of flexible cable extending back and forth across said central opening in an essentially horizontal direction and at least one second length of flexible cable extending back and forth across said central opening in an essentially vertical direction, to define said grid.

11. Apparatus according to claim 6, wherein said tensioning beams are outside said frame and said rigid members comprise a plurality of holes through which said elongated elements extend.

12. Apparatus according to claim 5, wherein said at least one tensioning beam comprises at each end spring receiving housing means for retaining said spring means between said at least one tensioning beam and said frame, said housing means being positioned to move within said guide channels.

13. Apparatus according to claim 6, wherein said two tensioning beams each comprise at each end thereof spring receiving housing means for retaining said spring means between each tensioning beam and said frame, said housing means being positioned to move within the pair of spaced guide channels associated with its respective tensioning beam.

14. A method of removing limbs from felled trees, comprising the steps of:
erecting a frame having a central opening;
resiliently supporting across said central opening a plurality of flexible elements, thereby defining a grid of said elements, said grid having a plurality of tree-receiving apertures and said apertures being expandible and contractible to accommodate the changing diameter of a tree trunk; and
pushing a felled tree through said grid.

15. The method according to claim 14, wherein said tree is pushed top first through said grid.

16. Apparatus for removing limbs from felled trees, comprising:
an essentially upright frame having a central opening;
a plurality of flexible elements extending across said central opening and defining a grid of said elements within said central opening, said grid having a plurality of tree-receiving apertures;
a plurality of means located on at least one side of said opening for anchoring said elements;
a plurality of resilient means located on an opposite side of said opening;
means operatively engaging said elements to said resilient means for deflecting said resilient means in response to force applied to said elements, whereby tension is maintained in said elements; and
means operatively engaged with said frame for anchoring said apparatus relative to the ground.

17. Apparatus according to claim 16, wherein each element comprises a length of cable which extends from said means for deflecting said resilient means across said opening, around one of said anchoring means and back to said means for deflecting said resilient means.

18. Apparatus according to claim 17, wherein said resilient means are coil springs bearing at one end on said frame; and said means for deflecting said resilient means comprises a plurality of force transmitting members bearing on the other ends of said springs, the ends of each length of cable being attached to a corresponding force transmitting member.

19. Apparatus according to claim 18, further comprising a plurality of wall means for laterally restraining said one end of said coil springs; wherein said force transmitting members each comprise a plate element bearing on said other end of said spring and restraining wall extending from said plate element around said spring, said ends of said length of cable being attached to said plate element.

20. Apparatus according to claim 16, wherein said frame comprises a plurality of side members, each side member comprising a pair of C-shaped beams placed back-to-back, said beams being separated by said anchoring means, said anchoring means comprising a plurality of rigid tube segments spaced along and extended between the backs of said beams.

21. Apparatus according to claim 18, further comprising a plurality of wall means attached to said frame for laterally restraining said coil springs, wherein said force transmitting members each comprise a plate element bearing on said other end of said spring, said ends of said length of cable being attached to said plate element.

22. Apparatus according to claim 21, wherein each of said wall means comprises a rigid cylinder extending from said frame along the length of said spring and past said plate element.

* * * * *